(12) United States Patent
Wendt et al.

(10) Patent No.: US 10,240,635 B2
(45) Date of Patent: Mar. 26, 2019

(54) BEARING ASSEMBLY

(71) Applicant: Aktiebolaget SKF, Gothenburg (SE)

(72) Inventors: Volker Wendt, Uechtelhausen/Zell (DE); Rico Dittmar, Schweinfurt (DE); Padelis Katsaros, Schweinfurt (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/685,426

(22) Filed: Aug. 24, 2017

(65) Prior Publication Data

US 2018/0066707 A1 Mar. 8, 2018

(30) Foreign Application Priority Data

Sep. 7, 2016 (DE) .................. 10 2016 216 940

(51) Int. Cl.
  *F16C 33/58* (2006.01)
  *F16C 19/36* (2006.01)
  *F16C 33/62* (2006.01)
  *F16C 35/067* (2006.01)
  *F16C 25/06* (2006.01)

(52) U.S. Cl.
  CPC .......... *F16C 33/585* (2013.01); *F16C 19/364* (2013.01); *F16C 25/06* (2013.01); *F16C 33/586* (2013.01); *F16C 33/62* (2013.01); *F16C 35/067* (2013.01); *F16C 2202/22* (2013.01); *F16C 2226/80* (2013.01); *F16C 2361/65* (2013.01)

(58) Field of Classification Search
  CPC .... F16C 19/364; F16C 19/525; F16C 35/067; F16C 2226/80
  See application file for complete search history.

(56) References Cited

U.S. PATENT DOCUMENTS 3,451,736 A * 6/1969 Riccio ................... F16C 35/067
  29/898.07
5,058,262 A * 10/1991 Brockmuller .......... B21K 25/00
  29/725

FOREIGN PATENT DOCUMENTS

JP  2005133869 A * 5/2005 ............ F16C 35/067
JP  2012219936 A * 11/2012 ............ F16C 33/067
JP  2014234907 A * 12/2014 ............ F16C 33/067

* cited by examiner

*Primary Examiner* — Phillip A Johnson
(74) *Attorney, Agent, or Firm* — Bryan Peckjian; SKF USA Inc. Patent Dept.

(57) ABSTRACT

A bearing assembly includes at least one rolling-element bearing that includes a bearing outer ring and a bearing inner ring and rolling elements disposed therebetween. The at least one rolling-element bearing is mounted in a component with the bearing outer ring in contact with the component, and the outer bearing ring includes a first edge surface extending between a rolling-element raceway and a radial end surface of bearing ring, and/or a second edge surface extending between an axial outer fitting surface and the radial end surface of the bearing ring. The component includes, on a surface facing the first and/or second edge surface, at least one material accumulation that interacts with the first and/or second edge surface.

11 Claims, 3 Drawing Sheets

BEARING ASSEMBLY

CROSS-REFERENCE

This application claims priority to German patent application no. 10 2016 216 940.8 filed on Sep. 7, 2016, the contents of which are fully incorporated herein by reference.

TECHNOLOGICAL FIELD

The present disclosure is directed to a bearing assembly mountable in a housing in a manner that reduces the effects of differences in the coefficients of thermal expansion of the housing and the bearing.

BACKGROUND

Such a bearing assembly includes at least one rolling-element bearing, in particular a tapered roller bearing, including a bearing outer ring and a bearing inner ring, between which rolling elements are disposed, as well as a housing receiving the bearing outer ring. For strength and weight reasons, the bearing components, such as the bearing rings, are usually comprised of steel, while light metal, in particular aluminum, is used for the housing. Here the bearing outer ring can be mounted in the housing via friction-fit, for example, using press-fit, so that a securing against rotation is achieved between the bearing outer ring and the housing, provided there is an overlap between the bearing outer ring and the housing.

However, it is problematic with such a bearing assembly that the housing comprised of the light metal has a greater thermal expansion than the bearing components, with the result that in operation, and with a temperature increase thus caused, a transition from the press-fit between the bearing outer ring and the housing to a clearance-fit can result, and thus the securing against rotation between the bearing outer ring and the housing is no longer ensured. A bearing outer ring released in this manner can thus rotate in the housing in operation, wear out its fit, and thus be destroyed.

In order to prevent such rotation it is known from the prior art, for example, to provide flanged bearing outer rings with screws to secure it against creeping. However, it is disadvantageous that the screws must be specially incorporated into the flange, which is complex and expensive in terms of manufacturing technology. In addition, the screws must be disposed in the bearing outer ring at the correct positions in order to prevent a rotating of the bearing outer ring with respect to the housing.

Furthermore it is known to provide grooves in a region of the clearance, which grooves include an element expanding with heat, which element is made of plastic or of an elastomeric material, which in turn has a higher thermal expansion than the housing, and thus fixes the bearing outer ring via a friction fit. However, it is disadvantageous here that for this purpose this element must be specially pre-manufactured in order to fit it into the grooves with the result that the manufacturing is thus in turn complex and expensive.

SUMMARY

It is therefore an aspect of the present disclosure to provide a bearing assembly that is simple in terms of manufacturing technology, using which an improved rotational securing can be ensured under operating conditions, in particular in the event of a temperature increase, with the result that the service life of the bearing assembly increases.

In the following a bearing assembly is presented including at least one rolling-element bearing, which includes a bearing outer ring and a bearing inner ring including rolling elements disposed therebetween. Here the rolling-element bearing is received in a component receiving at least one of the bearing rings. The component can be configured, for example, as a housing and/or a shaft, and/or as a flange, and/or as a cover. The rolling elements can optionally be received in a bearing cage.

In order to provide a bearing assembly using which an improved securing against rotation can be made possible under a temperature increase due to operation, it is provided that the bearing ring received by the component includes a first edge surface extending between a rolling-element raceway and a radial end surface of the bearing ring and/or a second edge surface extending between an axial fitting surface and the radial end surface of the bearing ring, and that the component receiving the bearing ring includes a material accumulation on a surface facing this first and/or second edge surface, which material accumulation interacts with the first and/or second edge surface. Due to the presence of the material accumulation and its interaction with the first and/or second edge surface, even with a temperature increase the component can remain in contact with the bearing ring, wherein the material accumulation maintains the press-fit of the component in contact with the bearing ring. A rotational securing can thereby be ensured even with high operating temperatures and a creeping of the bearing ring can be prevented.

According to a further preferred exemplary embodiment the first edge surface is angled radially outward. With a thermal expansion of the bearing components in the event of the to-be-expected operating temperatures the bearing ring can thereby be displaced essentially axially along the first edge, opposite the material accumulation. This displacing effect is particularly significant in particular with materials that have a different thermal expansion coefficient. If, for example, the component has a higher thermal expansion coefficient than the bearing ring, with heating the bearing ring would loosen. On the other hand, the material accumulation interacting with the edge slope ensures that with heating and the thermal expansion resulting therefrom the component exerts an essentially axial displacing force on the bearing ring, which in turn is held in its press-fit via the edge slope. Here the material accumulation is preferably configured essentially complementary to the first edge surface. In addition, in particular in a configuration as a double-row rolling-element bearing, the edge surface angled radially outward offers the advantage of ensuring a constant axial preload or a defined bearing clearance of the rolling-element bearings set against each other, even with heating.

In a further preferred exemplary embodiment the first and/or second edge surface includes at least one structure. Here according to a further preferred exemplary embodiment, the structure of the bearing ring and the material accumulation of the component form an interference-fit connection. During assembly the structure can press-into or cut-into the interference-fit impressable material accumulation, whereby the interference fit is formed. Here a type of gear forms between the bearing ring and the component receiving the bearing ring. Due to the interference-fit connection forming between the structure and the material accumulation, it is possible, even during operation of the bearing, that is, despite heating of the bearing assembly, to generate a fixed and stable interference-fit connection between the bearing ring and the component receiving the bearing ring such that a clearance fit can arise in the fit between the bearing ring and the component receiving the bearing ring, but the gear effectively prevents rotation of the bearing ring via the interference fit. The service life of the bearing assembly can thus also be increased. The material accumulation can be configured step-shaped, wedge-shaped, etc. Here it is preferred when the material accumulation is disposed or formed on the component essentially in an environment of the structure of the bearing ring.

According to a further preferred exemplary embodiment the component receiving the bearing ring includes a softer material than the bearing ring received by the component. It is thereby possible that during assembly, wherein the rolling-element bearing is pushed onto the stop, the structure of the bearing ring is pressed into the material accumulation of the component receiving the bearing ring. Here the component receiving the bearing ring can include a plastic, a non-ferrous metal, a light metal, or a light-metal alloy. Suitable and proven materials are, in particular, aluminum or magnesium, but also brass, copper, zinc, tin, or alloys including these constituents. The bearing components themselves, in particular the bearing ring including the structure, can be manufactured, for example, from rolling-element bearing steel.

According to a further preferred exemplary embodiment, the at least one structure encircles the first and/or second edge surface of the bearing ring. The interference-fit connection can thereby be provided uniformly over the entire circumference of the bearing ring, with the result that rotation of the bearing ring with respect to the component receiving at least one bearing ring can be avoided. Alternatively the structure can also be formed sectionally in the first and/or second edge surface of the bearing ring including the structure.

The structure is preferably designed such that it presses-in or cuts-in deep enough into the material accumulation such that the securing against rotation between the bearing ring including the structure and the component receiving the bearing ring can be maintained under operating conditions. The structure itself is preferably configured as a knurling. Such knurlings can be simply incorporated in the bearing ring, for example, by pressing or embossing on a lathe. Here the structure is preferably incorporated in the bearing ring during the soft working, that is, before a hardening step. A post-processing of the knurling, usually subsequent to the hardening, such as, for example, a grinding, can be omitted.

Furthermore, according to a further exemplary embodiment it is preferred when the knurling is configured serrated with at least one serration. Preferably the knurling includes many serrations with recesses lying therebetween. The serrated structure encourages a cutting-in into the material accumulation, whereby during assembly the bearing ring including the structure can be pressed particularly easily and simply into the material accumulation, with the result that a type of gear can be formed between the bearing ring and the component receiving the bearing ring. Here it is preferred when the at least one serration is configured sharp-edged.

In a further exemplary embodiment the at least one serration extends along the first edge surface from the rolling element raceway toward the end surface of the bearing ring and/or along the second edge surface from the fitting surface toward the end surface of the bearing ring. Due to the serrations disposed essentially transverse to the direction of rotation a holding function and thus the securing against rotation of the bearing ring including the structure and of the component receiving the bearing ring can be effectively improved. Furthermore, with progressing axial installation position the serration or the serrations can thereby be cut or pressed-in increasingly deeper into the material accumulation during assembly.

According to a further preferred exemplary embodiment the at least one serration is configured rounded and/or truncated-cone-shaped. Both serration designs facilitate assembly, since the bearing ring is bringable into the component and receivable therein without canting.

In a further preferred exemplary embodiment the bearing assembly comprises at least one rolling-element bearing that is configured as a tapered roller bearing. Here the first and/or second edge surface of the bearing ring is preferably disposed on a side on which the small diameter of the rolling elements is also disposed. This is advantageous since in this position the component receiving the bearing ring supports the bearing ring and also the entire rolling-element bearing. Even with the pressure prevailing under operating conditions, which pressure arises due to the tapered-roller movements, the interference-fit connection can thereby be ensured. Furthermore due to this arrangement, during assembly the bearing ring including the structure can be pushed-on or pressed onto the component receiving the bearing ring in the assembly direction in a particularly simple manner due to this arrangement.

Furthermore, the presented bearing assembly finds use in particular when the bearing assembly is configured as a double row tapered roller bearing with the rows set axially against each other. It is thereby possible, for example, to dispose the bearing ring including the first and/or second edge surface in the component receiving the bearing ring, for example, a housing, such that it does not rotate, and to support a further component, for example, a shaft, therein in a clearance-free manner. Here the double row tapered roller bearing can be disposed in a face-to-face or a back-to-back arrangement. However, in order to form a preloaded bearing assembly including two rolling-element bearings, at least one of the rolling-element bearings can also be configured as an angular contact ball bearing.

Further advantages and advantageous embodiments are specified in the description, the drawings, and the claims. Here in particular the combinations of features specified in the description and in the drawings are purely exemplary, with the result that the features can also be present individually or combined in other ways.

In the following the disclosure is described in more detail with reference to the exemplary embodiments depicted in the drawings. Here the exemplary embodiments and the combinations shown in the exemplary embodiments are purely exemplary and are not intended to define the scope of the disclosure. This scope is defined solely by the pending claims.

DETAILED DESCRIPTION

In the following, identical or functionally equivalent elements are designated by the same reference numbers.

Figure 1:
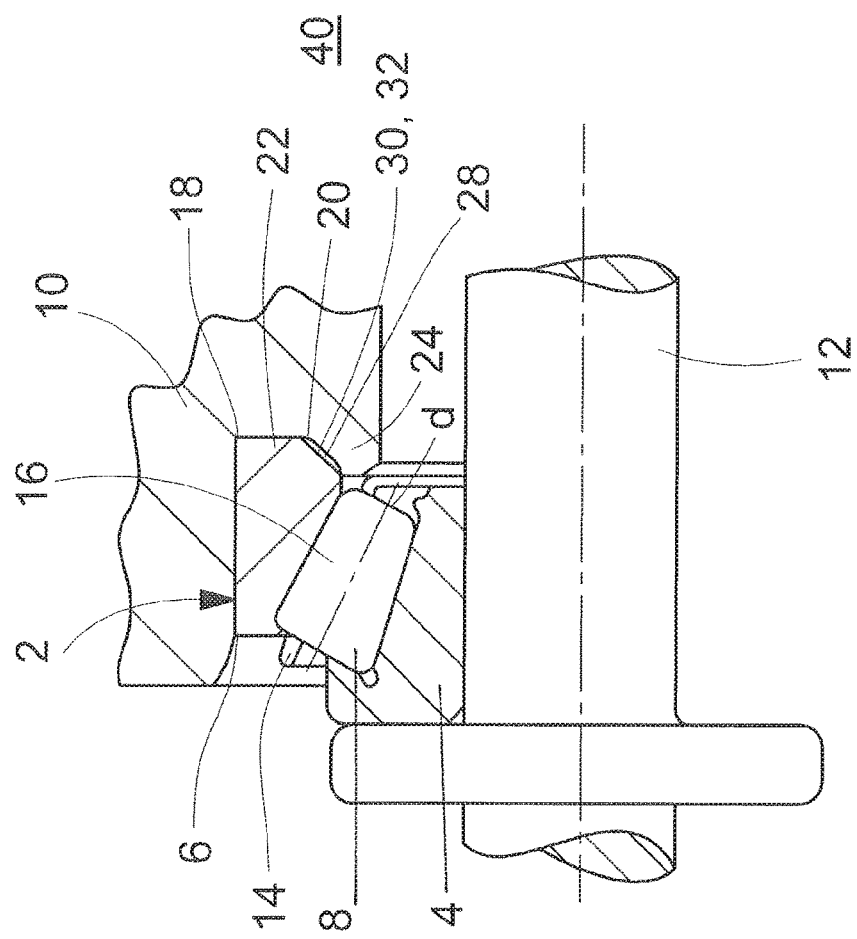
FIG. 1 is a schematic cross-sectional view though a bearing assembly according to the present disclosure.

FIG. 1 shows, in a schematic cross-sectional view, a bearing assembly 1 including a rolling-element bearing 2 configured as a tapered roller bearing, which includes a bearing inner ring 4 and a bearing outer ring 6, between which rolling elements 8 are disposed. Here the bearing outer ring 6 is received in a housing 10, while the bearing inner ring 4 is supported on a shaft 12. As furthermore depicted in FIG. 1, the rolling elements 8 can be received in a bearing cage 14. For reasons of strength and weight the housing 10 can include a light metal, such as, for example, aluminum, while the bearing components, such as, for example, the bearing outer ring 6, are manufactured from rolling-element bearing steel.

Figure 2:
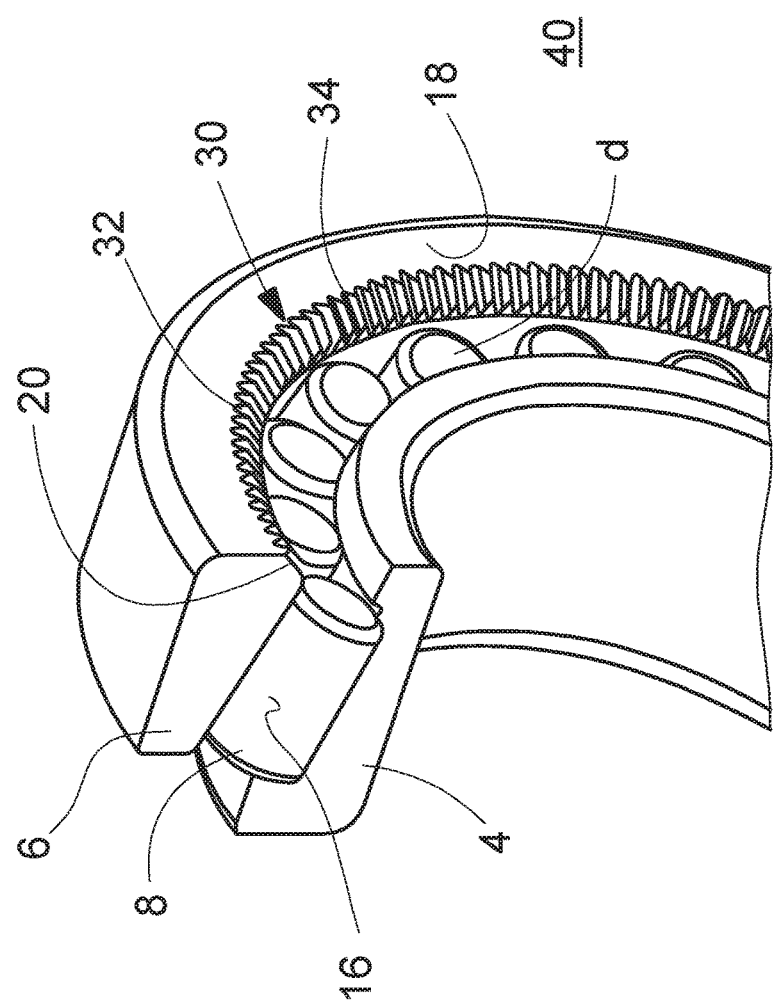
FIG. 2 is a schematic perspective view of the bearing assembly of FIG. 1.

As furthermore shown in FIG. 1 and in particular in FIG. 2, according to the disclosure the bearing outer ring 6 includes a first edge surface 20 extending between a rolling-element raceway 16 and a radial end surface 18. Furthermore, as depicted in particular in FIG. 1, the housing 10 includes a material accumulation 24 on a surface 22 facing the first edge surface 20, which material accumulation 24 interacts with the first edge surface 20. Even with a temperature increase the housing 10 can thereby also remain in contact with the bearing outer ring 6, wherein the material accumulation 24 maintains the press-fit of the housing 10 with the bearing outer ring 6, with the result that a securing against rotation is ensured and a creeping of the bearing outer ring 6 is prevented.

Here, as furthermore depicted in FIGS. 1 and 2, the first edge surface 20 is angled radially outward so that an edge slope forms. With a thermal expansion in the event of the to-be-expected operating temperatures the bearing outer ring 6 can be displaced essentially axially along the first edge surface 20, opposite the material accumulation 24. The edge slope ensures here that the bearing outer ring 6 including the edge slope slips along on the material accumulation 24 and always remains in the fixed seat. This effect is particularly significant in particular with different materials that have a different thermal expansion coefficient. Here the material accumulation 24, as depicted in particular in FIG. 1, includes a surface 28 essentially complementary to the first edge surface 20.

With a configuration of the bearing assembly 1 as a rolling-element bearing configured double-row the first edge surface 20, shown in FIGS. 1 and 2, set angled radially outward, is advantageous in particular since even with heating a constant axial preload or a defined bearing clearance of the rolling-element bearings set against each other can be ensured.

Furthermore, as depicted in particular in FIG. 2, the first edge surface 20 can include a structure 30. During assembly the structure 30 presses into the material accumulation 24, whereby an interference-fit connection is formed between the bearing outer ring 6 and the housing 10. An effective securing against rotation of the bearing outer ring 6 with respect to the housing 10 can thereby be ensured even under operating conditions, in particular with a temperature increase, and a clearance-fit can be prevented. In order to make possible a pressing-in of the structure 30 into the material accumulation 24 during assembly, the housing 10 preferably includes a softer material than the bearing outer ring 6.

As furthermore shown in FIG. 2, the structure 30 is configured encircling in the first edge surface of the bearing outer ring 6, whereby a uniform interference-fit connection can be made possible over the entire circumference of the bearing outer ring 6. Here the structure 30 is configured as a knurling, which can be incorporated into the edge surface 20 of the bearing outer ring 6 in simple manufacturing, for example, by pressing.

Furthermore the knurling, as depicted in FIG. 2, is serrated with serrations 32 distributed over the circumference of the bearing outer ring 6 and recesses 34 lying therebetween. Due to the in particular sharp-edged serration, the structure 30 can be particularly easily cut-in or pressed-in into the material accumulation 24.

Figure 3:
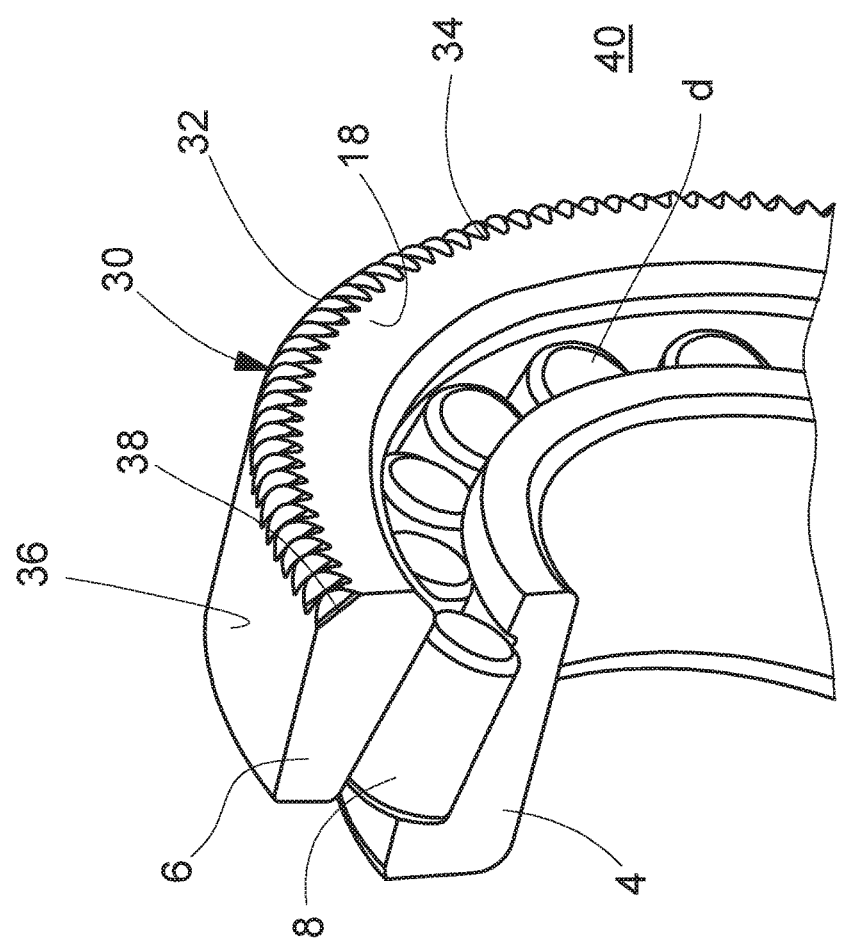
FIG. 3 is a schematic perspective view of a further exemplary embodiment of a bearing assembly according to the present disclosure.

As depicted in particular in the exemplary embodiment of FIG. 3, alternatively or additionally the bearing outer ring 6 can also include a second edge surface 38 extending between an axial fitting surface 36 and the radial end surface 18. Here the edge surface 38 shown in FIG. 3 also includes the serrated structure 30.

In order to ensure a particularly effective securing against rotation between the bearing outer ring 6 and the housing 10 under rotating conditions, as shown in FIG. 2 the serrations 32 extend from the rolling-element raceway 16 toward end surface 18 along the first edge surface 20 of the bearing outer ring 6. If the structure 30 is disposed in the second edge surface 38 extending between the axial fitting surface 36 and the end surface 18, as depicted in FIG. 3, the serrations 32 extend from the fitting surface 36 toward end surface 18 of the bearing outer ring 6. Here, as shown in FIG. 2, the serrations 32 can furthermore be configured truncated-cone-shaped, or rounded, as depicted in FIG. 3.

FIGS. 1 to 3 furthermore show that when the rolling-element bearing 2 is configured as a tapered roller bearing, the first and/or the second edge surface 20, 38 of the bearing outer ring 6 is disposed on a side 40 on which a small diameter d of the rolling-elements is also disposed. Via the alignment of the tapered rollers it can be ensured that the interference-fit connection is ensured even with an axial pressure prevailing under operating conditions, which axial pressure results due to tapered roller movements.

Overall, using the presented bearing assembly a bearing assembly including at least one rolling-element bearing including bearing rings, and including at least one component receiving the bearing rings is provided that ensures, even with a temperature increase due to operation, a securing against rotation between the bearing ring received by the component and the component receiving the bearing ring. Here the bearing ring includes a first edge surface extending between a rolling-element raceway and a radial end surface of the bearing ring, and/or a second edge surface extending between an axial fitting surface and the radial end surface of the bearing ring, which interacts with a material accumulation formed in the component. Such a bearing assembly finds use, for example, as a double-row rolling-element bearing assembly in transmissions of vehicles, since even under operating conditions it makes possible a uniform axial preload or a defined bearing clearance of the rolling-element bearings set against each other. Here the rolling-element bearings can be configured as tapered roller bearings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Bearing assembly
2 Rolling-element bearing
4 Bearing inner ring
6 Bearing outer ring
8 Rolling element
10 Housing
12 Shaft
14 Bearing cage
16 Rolling-element raceway
18 End surface
20 First edge surface
22 Surface facing the edge surface
24 Material accumulation
28 Complementary surface
30 Structure
32 Serrations
34 Recess
36 Fitting surface
38 Second edge surface
40 Side of the small rolling-element diameter
d Small rolling-element diameter

What is claimed is:

1. A bearing assembly comprising:
at least one rolling-element bearing that includes a bearing outer ring and a bearing inner ring and rolling elements disposed therebetween,
wherein the at least one rolling-element bearing is mounted in a component with the bearing outer ring in contact with the component,
wherein the outer bearing ring includes a first edge surface extending between a rolling-element raceway and a radial end surface of the bearing outer ring, and/or a second edge surface extending between an axial outer fitting surface and the radial end surface of the bearing outer ring,
wherein the component includes, on a surface facing the first and/or second edge surface, at least one material accumulation that interacts with the first and/or second edge surface, and wherein the first and/or the second edge surface includes at least one structure projecting away from the first and/or second edge surface configured to form an interference fit connection with the at least one material accumulation.

2. The bearing assembly according to claim 1, wherein the first edge surface is angled radially inward.

3. The bearing assembly according to claim 1, wherein the at least one structure and the at least one material accumulation form an interference-fit connection.

4. The bearing assembly according to claim 3, wherein the at least one structure is configured encircling or sectionally encircling in the first and/or second edge surface of the outer bearing ring.

5. The bearing assembly according to claim 3, wherein the at least one structure is a knurling.

6. The bearing assembly according to claim 5, wherein the knurling is serrated and includes including at least one serration.

7. The bearing assembly according to claim 6, wherein the at least one serration extends along the first edge surface from the rolling-element raceway toward the end surface of the bearing outer ring and/or along the second edge surface of the fitting surface toward the end surface of the bearing outer ring.

8. The bearing assembly according to claim 5, wherein the at least one serration is rounded and/or truncated-cone-shaped.

9. The bearing assembly according to claim 1, wherein the component receiving the bearing outer ring includes a softer material than the bearing outer ring received by the component.

10. The bearing assembly according to claim 1, wherein the at least one rolling-element bearing comprises a tapered roller bearing, and wherein the first and/or second edge surface of the bearing outer ring is disposed on a side of the bearing assembly on having a smaller rolling-element diameter (d).

11. A bearing assembly comprising:
at least one rolling-element bearing that includes a bearing outer ring and a bearing inner ring and rolling elements disposed therebetween,
wherein the at least one rolling-element bearing is mounted in a component with the bearing outer ring in contact with the component,
wherein the outer bearing ring includes a first edge surface extending between a rolling-element raceway and a radial end surface of bearing ring, and/or a second edge surface extending between an axial outer fitting surface and the radial end surface of the bearing outer ring, the first and/or second edge surfaces having serrations projecting away from the first and/or second edge surface, and
wherein the bearing outer ring is pressed into the component such that the serrations bite into the component and form an interference fit between the bearing outer ring and the component.

* * * * *